Nov. 8, 1960 E. R. DUNKELBERGER 2,958,948

DRAWING ARRANGEMENT

Filed July 2, 1956 2 Sheets-Sheet 1

INVENTOR.

EDWIN R. DUNKELBERGER

BY

Julian C. Renfro

Nov. 8, 1960 E. R. DUNKELBERGER 2,958,948

DRAWING ARRANGEMENT

Filed July 2, 1956 2 Sheets-Sheet 2

INVENTOR

EDWIN R. DUNKELBERGER

BY Julian C. Renfro

ATTORNEY

United States Patent Office 2,958,948

Patented Nov. 8, 1960

2,958,948

DRAWING ARRANGEMENT

Edwin R. Dunkelberger, Baynesville, Md., assignor to The Martin Company, a corporation of Maryland Filed July 2, 1956, Ser. No. 595,325

6 Claims. (Cl. 33—1)

This invention relates to a method of producing drawings such as circuit diagrams by the use of tracing templates, and to the components and arrangement of components for carrying out this method.

In the past, the preparation of a circuit diagram showing a complicated arrangement of electrical components has been a tedious job. A draftsman frequently is assigned the task of preparing a drawing of a circuit diagram from a circuit that has been drawn freehand, and which has been altered and interlined extensively. In order to achieve a drawing in which there are no components crowded together and which utilizes in the best manner the area of a standard sheet of drafting paper, it is often necessary for a circuit diagram to be redrawn several times. This manner of preparing a drawing is not only slow and painstaking, but also it demands the efforts of a skilled draftsman.

In addition, the preparation of a circuit diagram has been a slow job for another reason. In order to use standard electrical symbols throughout it is conventional to trace from a stencil into which these symbols have been cut, and to use appropriate drafting instruments such as straightedges and curves in order to create correct and legible symbolic representations of vacuum tubes, capacitors, and the like. This procedure has the disadvantage that different draftsmen may use symbols of different sizes and shapes to represent the same components, thus resulting in non-uniform drawings.

According to this invention, a drafting arrangement for producing uniform drawings is provided, comprising a mounting surface upon which a tracing sheet can be placed, and at least one template located on said mounting surface. The mounting surface can have indicia thereon to facilitate the placement of templates in a predetermined arrangement on said mounting surface, and each of the templates has a symbolic representation on its outward surface, such as the representation of a vacuum tube, a capacitor, or the like.

A method of preparing a drawing according to this invention involves laying out a plurality of templates upon a mounting surface so as to represent the basic drawing configuration. If, for instance, a circuit diagram is to be prepared, each of the templates used bears an electrical symbol on its outward surface, and the templates are located and relocated upon the mounting surface until an effective arrangement of the electrical components of the circuit is achieved. A tracing sheet is then placed over the templates, and the symbols are transcribed onto said sheet from the templates. The electrical components on the sheet are then interconnected so as to create the circuit diagram.

The templates used can be made of thin sheet material, and according to one modification can have an adhesive on one side thereof so that the templates can be removably secured to the mounting surface or drawing board. According to another modification, instead of the mounting surface having indicia ruled on its surface, the indicia can be in the form of a number of small intersecting grooves arranged in a quadrille pattern, and the templates used with such an arrangement have protrusions on their underside that are designed to fit into these grooves, thereby to prevent slippage of the templates from the position in which they were placed. The symbolic representation on the upper surface of the template can be etched or otherwise indented in such surface to facilitate transcribing the symbol onto the tracing sheet by means of a tracing tool. As should be apparent, this invention can be practiced even by a comparatively unskilled draftsman.

An object of this invention is to provide a method of producing drawings, such as circuit diagrams, which will facilitate the placement of electrical components in a neat, accurate arrangement on the drawing, and thereby make possible the best utilization of the area of a sheet of drafting paper.

Another object of this invention is to provide a method of producing drawings whereby a draftsman can attain very rapidly a neat and effective arrangement of the components of the drawing.

A further object of this invention is to provide a tracing arrangement utilizing templates bearing symbolic representations on their outward surface whereby the representations can be traced by means of a tracing tool directly onto the final sheet of drawing.

A still further object of this invention is to provide templates having uniform symbolic representations thereon by the use of which drawings can be prepared rapidly, even by comparatively unskilled draftsmen.

Other objects and advantages of the present invention will become apparent from a study of the following description taken with the accompanying drawings which are merely illustrative of the apparatus with which the method of this invention can be practiced.

Figure 2:
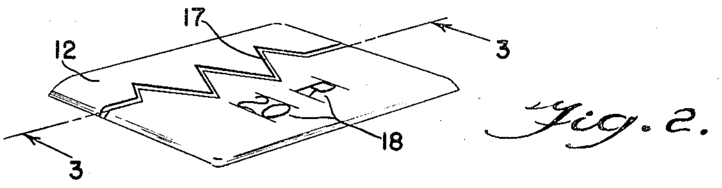
Figure 2 is a perspective view of a typical template, illustrating the placement of a conventional electrical symbol on the outward surface of the template.
Figure 4:
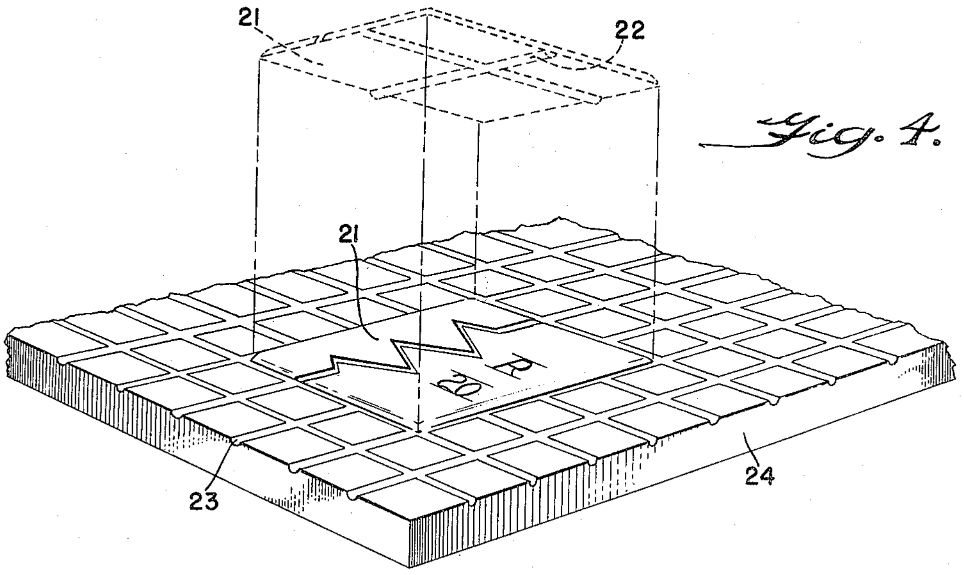
Figure 3:
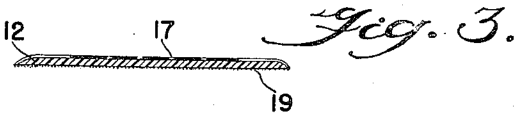

Figure 3 is a view taken along line 3—3 in Figure 2 revealing the use of a template having a symbol indented into its upper surface, and a pressure-sensitive adhesive on its lower surface; and Figure 4 is a partial perspective view of a modified form of the invention, illustrating how the lower surface of a template may be equipped with raised portions to fit into corresponding grooves on the drafting board to prevent slippage.

Figure 1:
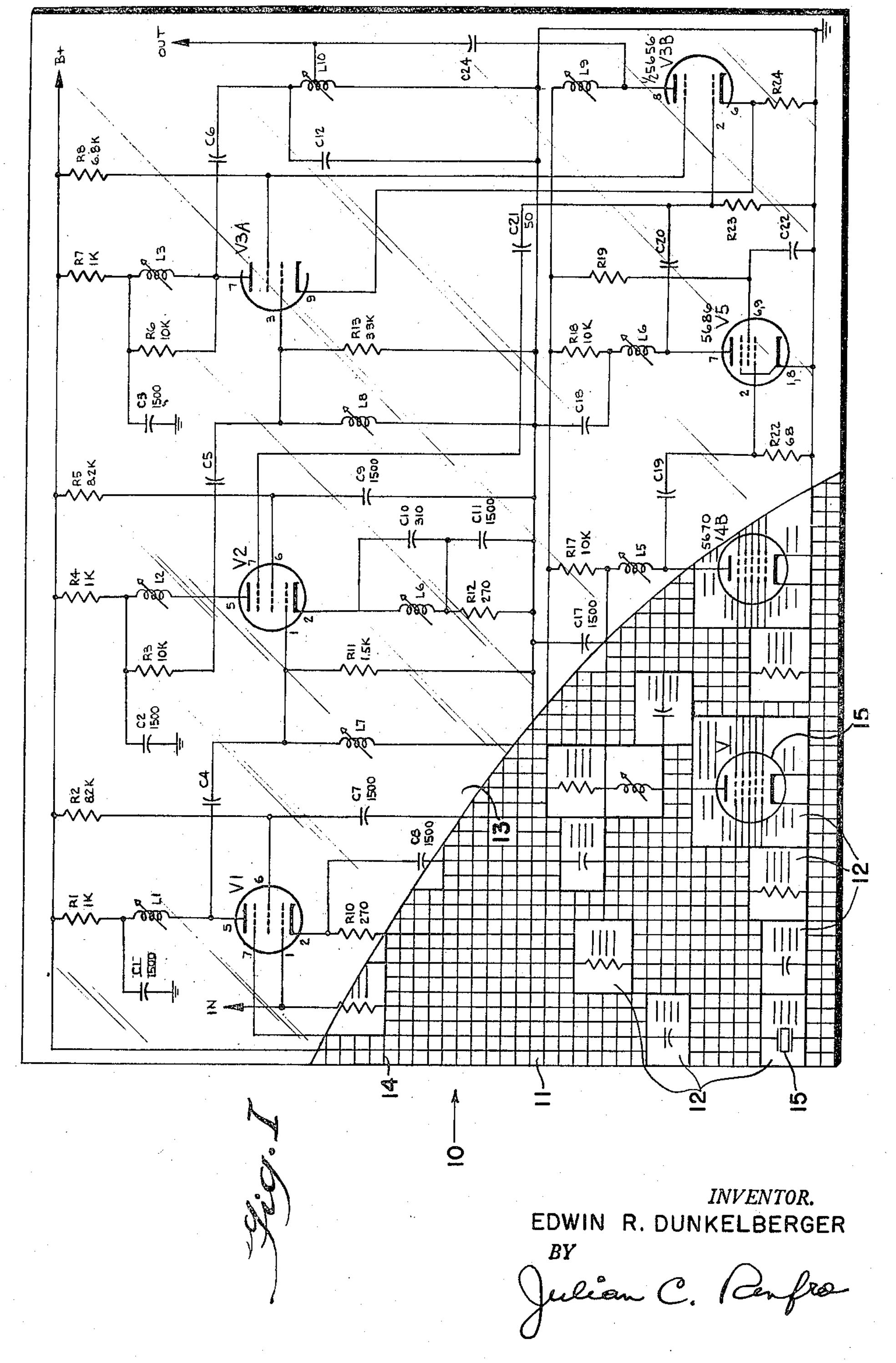
Figure 1 is a plan view of a drawing board with templates mounted thereon so as to represent the components of a circuit, and with tracing paper located over a greater portion of the drawing board to illustrate how a circuit diagram can be prepared according to this invention.

Referring to the drawings, in Fig. 1 a drafting arrangement 10 is shown comprising a drawing board 11, templates 12, and a sheet of tracing paper 13. The drawing board is shown to have a quadrille-ruled surface 14 inasmuch as such facilitates the precise placement of templates 12 upon the surface of the drawing board.

The templates 12 can be made of plastic, metal, or any other suitable material, and upon the outward surface of each template is located a symbolic representation 15. As will be described at a greater length hereinafter, each template can be secured in a desired position on the drafting board during the tracing operation by means of an adhesive, by magnetic attraction, or by other means hereinafter described.

According to one embodiment of this invention, the symbolic representation 15 on the outward surface of each template can be in the form of an indentation or groove 17, for this simplifies the procedure of tracing the symbol onto a sheet placed over the templates located on the drawing board. This groove, which is to be observed in Figs. 2 through 4, can, for example, be created in the outward surface of each template by means of conventional etching techniques. In general, this may involve creating by photography the desired symbolic representations upon the copper surface of a thin sheet of laminated reinforced plastic. This plastic can be of epoxy, phenolic or polyester resin, which is commercially obtainable in thin sheet form, with a very thin layer of copper on one side. When portions of the copper surface have been etched away such as by the use of acid, the resulting indentations or grooves define the desired symbolic representation on the copper surface of the sheet material. As should be apparent, a number of symbolic representations can be created simultaneously on a single copper coated sheet, and then the sheet cut into segments to form a number of templates. Because the copper has actually been removed in a pattern representative of the symbolic representations, suitable indentations or grooves are thereby formed in the surface of each template, so that by means of conventional tracing techniques, the representation of the template can be traced onto the drafting paper placed thereover.

Alternatively, templates may be employed that have symbols drawn or painted on the upper surface thereof, or which may have grooves that instead of being etched in a metallic surface in the aforementioned manner, have grooves cut or formed directly in the upper surface of a template that is made entirely of laminate or plastic.

In addition to the symbolic representation 15, the upper surface of a template may contain an additional symbol 18 that will aid a draftsman in further identifying each particular component of the electronic circuit he is drawing. For example, in Fig. 2, the symbolic representation of a resistor is shown, with a letter R located alongside it. Spaced below this letter may be a number indicative of the resistance in ohms of the resistor. This enables a draftsman to trace onto his tracing paper the letter R (which can be immediately followed by a number that identifies the particular resistor of the circuit), and then, on the line below this, can be traced the number describing the resistance of the resistor. Alternatively, each template can be equipped with a series of short lines to aid the draftsman in placing descriptive letters and numbers. Note the symbols of Fig. 1.

In the embodiment of this invention represented by Figs. 1 through 3, the templates 12 are secured in the desired position on the drafting board by adhesive so that the draftsman can work upon the board without the danger of the templates becoming accidentally displaced from the desired arrangement. In accordance with this embodiment, the underside 19 of each template is coated with a suitable pressure-sensitive type of adhesive such as Adex 3075, which is made by Adex Manufacturing Company of Baltimore, Maryland. This type of adhesive remains "tacky" and will hold the templates in the desired position on a drawing board, but yet will permit removal from the drawing board without any degree of tearing of any surface involved. Alternatively, the templates can be made of ferric metal and maintained in position by magnetic attraction. In each of these instances, the templates are placed on the drawing board in such a manner as to be in proper alignment with the quadrille-ruled surface, for this expedites the placement of the templates on the drafting board in proper alignment with the other templates on the board. When this has been properly done, it is quite a simple matter for the draftsman to interconnect on his tracing paper whatever symbols it may be desirable to connect in order to form the circuit diagram.

Referring to Fig. 1, in conformance with a circuit diagram to be copied, the vacuum tube symbol nearest the lower left hand corner of this figure, for example, is to be interconnected with a variable inductance and a resistor that are to be located on the circuit directly above the plate of this vacuum tube. In this instance, the draftsman should be careful to place the grooved line leading from the plate of this tube in alignment with a vertically-disposed line on the drafting board, and to place the inductance and resistor symbols in alignment with the same line. When this has been properly done, the draftsman can place his tracing paper over the templates, and easily interconnect them by a straight vertical line, using a liquid lead pencil, a stylus, a drafting pencil, or any other suitable instrument to accomplish the tracing. Therefore, because of the ruled surface of drawing board 11, it is relatively simple to locate the templates upon the board to form a circuit whose components are attractively placed, and which can be connected by straight lines.

In Fig. 4, another embodiment is shown, in which templates 21 can be maintained in the desired position on the drawing board by means of protrusions 22 on the lower side of each template, which fit into suitable grooves in the drawing board so as to prevent the undesired shifting of the templates. In this instance, the quadrille lines of Fig. 1 are replaced by grooves 23 that are arranged in a quadrille pattern on drawing board 24 in the manner shown in Fig. 4. In addition to preventing the displacement of the templates, this arrangement of complementary protrusions and grooves also brings about the correct centering of each electronic symbol with respect to the grooves 23 of the drafting board, so that the draftsman can trace from one symbol to the next, along a groove 23, without finding it necessary to employ a straight edge, or any other drafting aid. This centering of the electronic symbols with respect to the grooves 23 is, of course, made possible by the fact that the protrusions 22 of each template are so located relative to the symbolic representation of the outward side of the template that when the protrusions are placed into grooves 23 on the drawing board, the lines or grooves on the outward surface of the template leading away from the symbolic representation are automatically placed in correct alignment with the grooves. 23. In this regard note that the lines on each end of the symbol of template 21 shown in Fig. 4 lead directly to a groove 23 of the drafting board. As previously stated, an instrument such as a liquid lead pencil can be employed to trace onto tracing paper the symbolic representations of the template, and to interconnect that symbol with the next symbol that is to be placed in the diagram, utilizing the groove 23 to guide the tracing tool between the symbols.

The preparation of circuit diagrams according to this invention is believed to be clear from the foregoing, but as a further example, assume that a draftsman is assigned to prepare a circuit diagram from a rough circuit diagram or schematic of an electrical circuit. By the use of this invention, it will be unnecessary for him to make a number of preliminary sketches so as to achieve the most effective layout of the circuit components, for it merely will be necessary for him to arrange the templates on the mounting surface or drawing board until the most efficient and comprehensive arrangement of components for a given size tracing sheet can be attained. For example, in Fig. 1 there are seven vacuum tubes (or portions thereof) to be represented in the circuit shown in this figure. That the draftman can prepare a circuit diagram that effectively uses the area of the sheet of drawing paper without having crowded portions, the draftsman takes seven vacuum tube templates and places them on the drawing board. He places them in a seemingly reasonable arrangement, and then proceeds to add templates representing the resistors, the capacitors, and the like so as to create a representation on the drawing board of the circuit diagram that he is preparing. It should be noted at this point that the templates all have finite size, even those representing the smaller components such as capacitors. By virtue of this fact, it is impossible for the draftsman to create a crowded arrangement of components, for each symbol template can be placed no closer to the next template than its very size permits.

It frequently may be necessary to move the symbols around considerably in order to create an effective, clear drawing that makes full, efficient use of all of the area of the drafting paper. Even so, this is not a particularly time-consuming operation and is certainly much more rapid than the previous methods of ascertaining effective use of the drafting paper, namely, that of drawing and redrawing the circuits until a circuit whose components are not crowded together is achieved. Then, when the desired arrangement has been attained, the templates are pressed firmly down upon the drafting board so that they will not be displaced easily from the desired position. It should be noted at this point that in the embodiment utilizing pressure-sensitive adhesive on the bottom of each template that the adhesive can be protected by a suitable "slip sheet" so that the templates will not tend to stick to each other or to the drawing board until such time as the draftsman is reasonably certain as to the placement of the templates. Then, by removing the slip sheet from each template, the templates can be so placed that deliberate effort will be required in order to remove a template from the drawing board. As previously mentioned, however, the nature of pressure-sensitive adhesive is such that there will be no injury to either a template or to the mounting surface upon which it is placed, despite the fact that a template is applied, removed, reapplied and so on for a number of times.

The lines or grooves on each template representing the symbol extend to the edges of the template to facilitate the alignment of the symbol with the appropriate quadrille line or groove of the drafting board. A component that is to be interconnected to another symbol is placed upon the same line or groove as the other symbol, thereby to insure the formation of a circuit that will have straight, regular connecting lines between the components. Then, when this has been done, it is a simple matter to draw straight lines on the tracing paper representing the wires intermediate the electrical components, so as to complete the preparation of the circuit diagram.

It will be understood that the new features herein disclosed and set forth in the appended claims may be employed in ways and forms different from those in the preferred embodiments described above and illustrated in the drawings, without departing from the contributions of this invention.

I claim:

1. A method for the rapid creation of circuit diagrams utilizing tracing means, a mounting surface having a quadrille pattern indented therein, and a plurality of thin templates, each of which bear an electrical symbol indented on its surface, comprising the steps of placing said templates in a desired circuit arrangement upon said mounting surface and removably securing them thereto, placing a tracing sheet over the arrangement, and deforming said tracing sheet over the identations of said template symbols as well as the circuit-connecting indentations of said quadrille surface with said tracing means so as to guide said tracing means and thereby transcribe the circuit diagram onto said tracing sheet.

2. A drafting arrangement for guiding a tracing tool over a tracing sheet to produce uniform drawings comprising a mounting surface having a quadrille pattern indented therein, a plurality of thin templates having symbolic representations indented upon the outward surfaces thereof and removably secured to said mounting surface, a tracing sheet disposed over said templates, and tracing means in contact with said tracing sheet for applying local pressure over the indentations to cause said sheet to deform slightly, such deformation allowing the indentations in said templates as well as the indentations of said quadrille surface between templates to form an effective guide for said tracing means, latter means leaving an indication upon said sheet of the configuration of said symbols, and their interconnections, thereby to create a uniform drawing.

3. A drafting arrangement for guiding a tracing tool over a tracing sheet to produce circuit diagrams comprising a mounting surface having a quadrille pattern indented therein, a plurality of thin templates having electrical symbols indented upon the outward surfaces thereof and removably secured in circuit-defining relationship to said mounting surface, a tracing sheet disposed over said templates, and tracing means in contact with said tracing sheet for applying local pressure over the indentations to cause said sheet to deform slightly, such deformation allowing the indentations in said templates as well as the identations of said quadrille surface between templates to form an effective guide for said tracing means, leaving an indication upon said sheet of the configuration of said symbols and their interconnections, thereby to create a circuit diagram.

4. A drafting arrangement as defined in claim 2 in which said thin templates are removably secured to said mounting surface with a pressure sensitive adhesive.

5. A drafting arrangement as defined in claim 2 in which each template is made of sheet material having a thin layer of metal on one side thereof in which a symbolic representation for guiding a tracing tool is indented.

6. A drafting arrangement as defined in claim 2 in which each template is made of sheet material having a thin layer of metal on one side thereof in which a symbolic representation for guiding a tracing tool is indented in its outward surface, said template having at least one comparatively thin protruding strip on the surface opposite said outward surface adapted to engage the indentations of said quadrille pattern on said mounting surface, thereby preventing accidental displacement of the template from a desired position on the mounting surface.

References Cited in the file of this patent

UNITED STATES PATENTS

| | | |
|---|---|---|
| D. 156,686 | Adams | Jan. 3, 1950 |
| 471,666 | Doty | Mar. 29, 1892 |
| 830,282 | Andrews | Sept. 4, 1906 |
| 1,022,384 | Bahr | Apr. 2, 1912 |
| 1,280,527 | Novotny | Oct. 1, 1918 |
| 1,519,695 | Hovhannessian | Dec. 16, 1924 |
| 1,625,041 | Marshall | Apr. 19, 1927 |
| 1,716,036 | Dunning | June 4, 1929 |
| 1,736,445 | Jannenga et al. | Nov. 15, 1929 |
| 1,859,755 | Thompson | May 24, 1932 |
| 2,000,528 | Linderman | May 7, 1935 |
| 2,209,498 | Wittman | July 30, 1940 |
| 2,323,145 | Mabry | June 29, 1943 |
| 2,369,960 | Gage et al. | Feb. 20, 1945 |
| 2,495,975 | Kelly | Jan. 31, 1950 |
| 2,545,409 | McCall | Mar. 13, 1951 |

FOREIGN PATENTS

| | | |
|---|---|---|
| 495,070 | Germany | Apr. 2, 1930 |

OTHER REFERENCES

Publication: Tooling and Production, December 1952, p. 118.